(12) United States Patent
Lassanske

(10) Patent No.: US 8,336,400 B2
(45) Date of Patent: Dec. 25, 2012

(54) REAR HUB POWER METER FOR A BICYCLE

(75) Inventor: Todd W. Lassanske, Madison, WI (US)

(73) Assignee: Saris Cycling Group, Inc., Madison, WI (US)

( * ) Notice: Subject to any disclaimer, the term of this patent is extended or adjusted under 35 U.S.C. 154(b) by 420 days.

(21) Appl. No.: 12/625,161

(22) Filed: Nov. 24, 2009

(65) Prior Publication Data

US 2011/0120232 A1 May 26, 2011

(51) Int. Cl.
*G01L 3/02* (2006.01)
(52) U.S. Cl. .................................. 73/862.29
(58) Field of Classification Search ........... 73/862.29, 73/862.191
See application file for complete search history.

(56) References Cited

U.S. PATENT DOCUMENTS

| | | |
|---|---|---|
| 3,845,663 A | 11/1974 | Blomberg et al. |
| 4,141,248 A | 2/1979 | Bargenda |
| 4,423,630 A | 1/1984 | Morrison |
| 4,463,433 A | 7/1984 | Hull et al. |
| 4,625,551 A | 12/1986 | Carnielli |
| 4,630,818 A | 12/1986 | Saarinen |
| 4,785,674 A | 11/1988 | Orman et al. |
| 4,811,612 A | 3/1989 | Mercat |
| 4,966,380 A | 10/1990 | Mercat |
| 5,016,478 A | 5/1991 | Mercat |
| 5,027,303 A | 6/1991 | Witte |
| 5,031,455 A | 7/1991 | Cline |
| 5,065,633 A | 11/1991 | Mercat |
| 5,154,677 A | 10/1992 | Ito |
| 5,202,627 A | 4/1993 | Sale |
| 5,257,540 A | 11/1993 | Bower et al. |
| 5,314,366 A | 5/1994 | Palm |
| 5,324,238 A | 6/1994 | Karp |
| 5,591,908 A | 1/1997 | Reid |
| 5,816,599 A | 10/1998 | Soejima et al. |
| 6,138,520 A | 10/2000 | Chang |
| 6,199,021 B1 | 3/2001 | Cote et al. |
| 6,263,992 B1 | 7/2001 | Li |
| 6,354,980 B1 | 3/2002 | Grant |
| 6,418,797 B1 | 7/2002 | Ambrosina et al. |
| 6,439,067 B1 | 8/2002 | Goldman et al. |
| 6,701,793 B2 | 3/2004 | Wallin et al. |

(Continued)

FOREIGN PATENT DOCUMENTS

DE 3722728 12/1988

(Continued)

OTHER PUBLICATIONS

PCT/US2010/055409, International Search Report and Written Opinion, dated Feb. 17, 2011.

*Primary Examiner* — Lisa Caputo
*Assistant Examiner* — Octavia Davis-Hollington
(74) *Attorney, Agent, or Firm* — Boyle Fredrickson, S.C.

(57) ABSTRACT

A power sensing arrangement for the rear hub of a bicycle. The power sensing arrangement includes a torque sensing assembly including torque sensing elements configured to measure a user applied torque. The torque sensing elements are in communication with an electronics assembly configured to process the measured data and transmit it to a receiver. The torque sensing elements are interconnected with the free hub assembly of the rear hub, and are operable to detect torque applied to the free hub from the rear cassette.

21 Claims, 13 Drawing Sheets

U.S. PATENT DOCUMENTS

| | | |
|---|---|---|
| 6,886,416 B2 | 5/2005 | Tsay et al. |
| 6,959,612 B2 | 11/2005 | May |
| 7,047,817 B2 | 5/2006 | Lanham |
| 7,059,618 B2 * | 6/2006 | Mallard ................. 280/216 |
| 7,061,228 B2 | 6/2006 | Ichida et al. |
| 7,257,468 B1 | 8/2007 | Costa et al. |
| 2001/0030408 A1 | 10/2001 | Miyoshi |
| 2003/0024310 A1 | 2/2003 | Montagnon |
| 2003/0094783 A1 | 5/2003 | Miyoshi |
| 2003/0094784 A1 | 5/2003 | Miyoshi |
| 2003/0132600 A1 | 7/2003 | Miyoshi |
| 2003/0132601 A1 | 7/2003 | Miyoshi |
| 2003/0132602 A1 | 7/2003 | Miyoshi |
| 2004/0035225 A1 | 2/2004 | Crasset |
| 2004/0113608 A1 | 6/2004 | Ichida et al. |
| 2004/0237666 A1 | 12/2004 | Winkenbach et al. |
| 2005/0043915 A1 | 2/2005 | Ueda |
| 2005/0080545 A1 | 4/2005 | Takagi |
| 2005/0160835 A1 | 7/2005 | Masaki et al. |
| 2005/0195094 A1 | 9/2005 | White |
| 2005/0199075 A1 | 9/2005 | Tokoro et al. |
| 2005/0275561 A1 | 12/2005 | Kolda et al. |
| 2006/0095191 A1 | 5/2006 | Lin |
| 2006/0108183 A1 | 5/2006 | Watarai |
| 2006/0248965 A1 | 11/2006 | Wyatt et al. |
| 2010/0050785 A1 | 3/2010 | Roessingh et al. |
| 2010/0280766 A1 * | 11/2010 | Roessingh et al. ............. 702/41 |

FOREIGN PATENT DOCUMENTS

| | | |
|---|---|---|
| EP | 0386005 | 7/1988 |
| WO | WO8900401 | 1/1989 |
| WO | 99/45350 | 9/1999 |
| WO | WO0130643 | 5/2001 |
| WO | 2009/041820 | 4/2009 |

\* cited by examiner

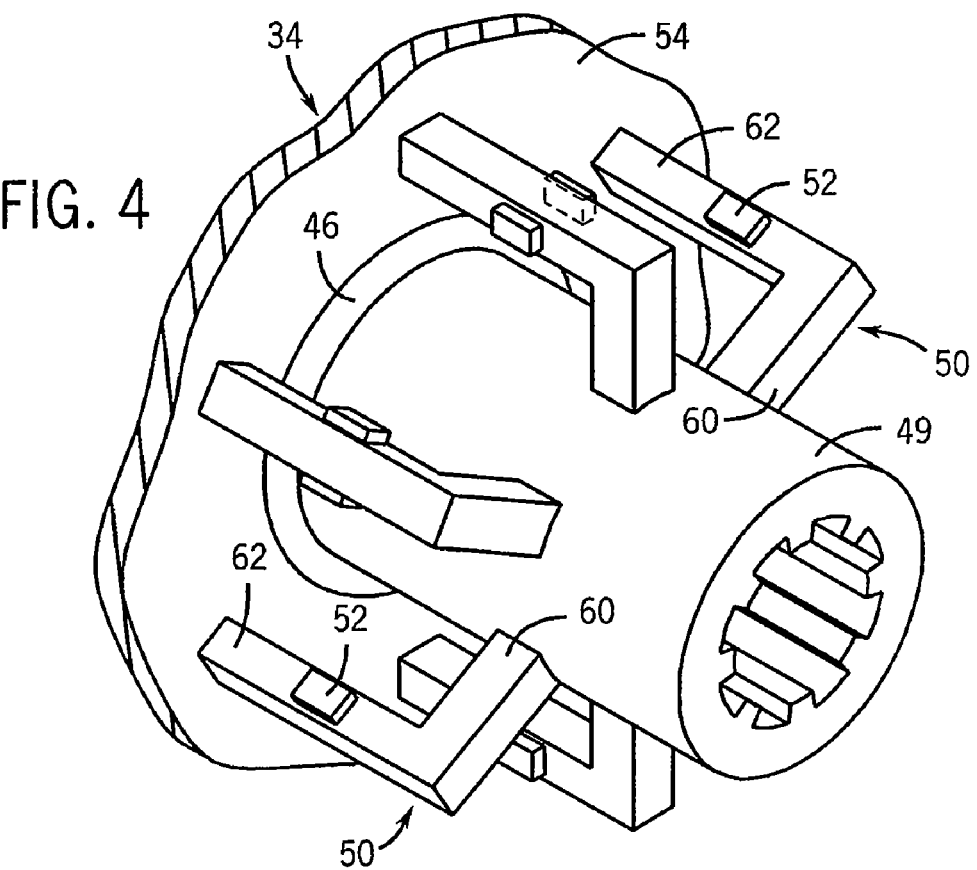
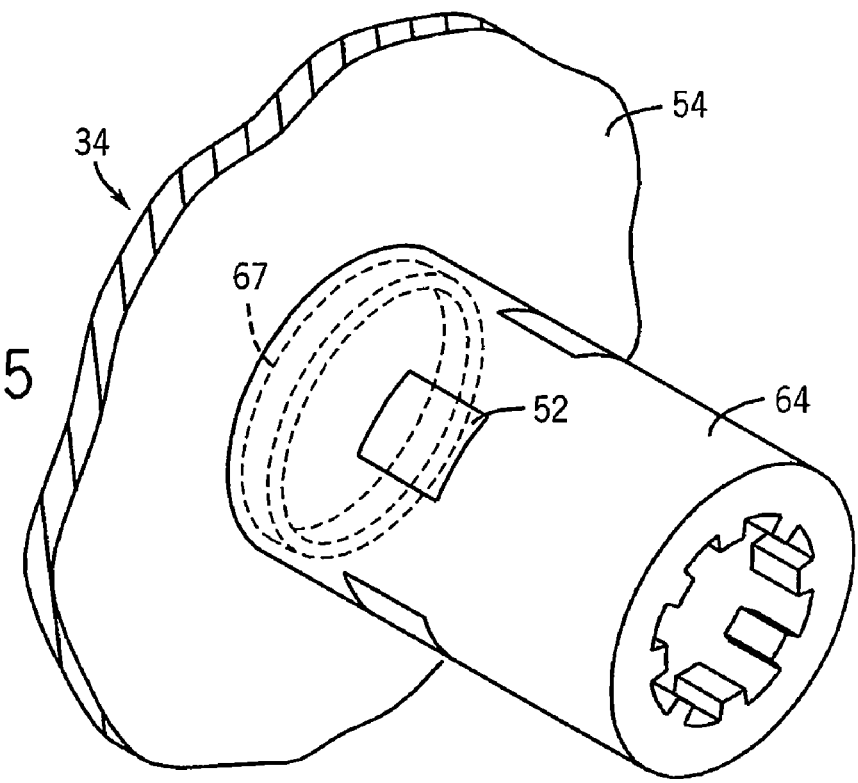

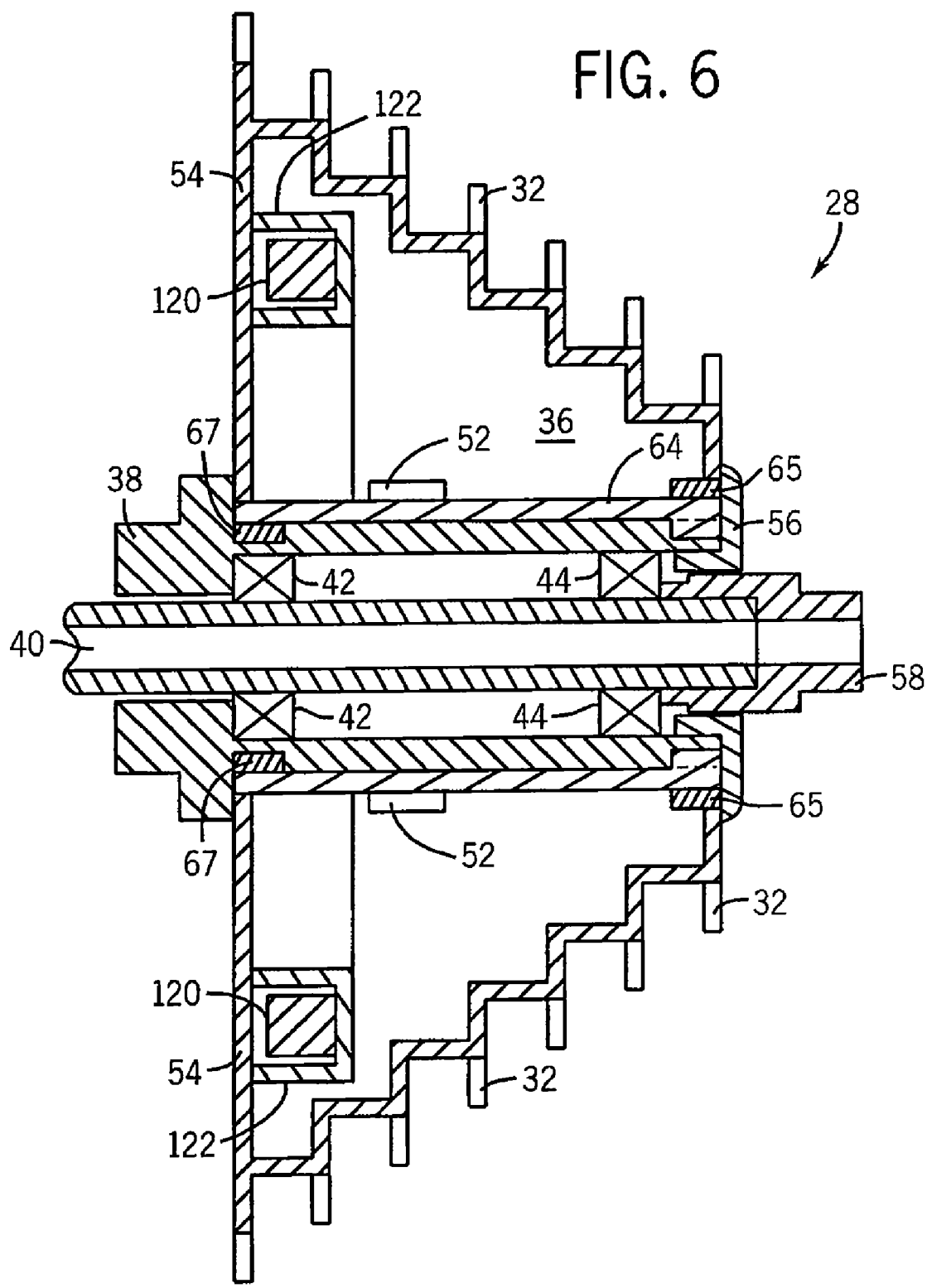

REAR HUB POWER METER FOR A BICYCLE

BACKGROUND AND SUMMARY OF THE INVENTION

The present invention relates to a power measuring device for use with a bicycle or other device that is powered by user operation of a pedal assembly and, more particularly, to a power meter located between the cassette of a rear wheel assembly of a bicycle and the freehub of the bicycle, that measures the torque placed on the rear wheel assembly to determine the amount of power exerted by the user during operation of the pedal assembly.

Bicycles, stationary trainers and fixed spinner bikes outfitted with a device used to sense or detect torque and/or power are generally known. One exemplary power meter is the POWERTAP, commercially available from Saris Cycling Group, Inc. of Madison, Wis. Another representative power meter is described in U.S. Pat. No. 6,418,797 to Ambrosina et al., the entire disclosure of which is incorporated herein by reference. The power meter described in the '797 patent is designed to measure the torque applied to the rear hub of the cycle. The applied torque measurements together with angular velocity measurements are then used to calculate power in a manner understood by those in the art and thus provide an indication of the work exerted by a user to pedal the bicycle, trainer, etc.

To measure the torque applied to the rear hub or rear wheel assembly of the bicycle, a torque coupling member is typically mounted to the rear hub or forms part of the rear hub itself. Strain gauges or other torque sensing devices are mounted to the rear hub and in communication with the torque coupling member such that any torque experienced by the torque coupling member is detected by the strain gauges. The output of the strain gauges is then fed to a processing device that together with angular velocity information, calculates power information that can be displayed suitably to the user together with other information, such as speed, distance traveled, etc.

Electronics for the measurement of the strain, torque, power and angular velocity measurements are generally mounted in the rear hub assembly as well. The electronics include a battery for powering the electronics as well as circuitry configured to process, amplify, and convert the associated data. A radio frequency (RF) transmitter or the like is provided for transmitting the collected data to a receiver for further processing, which is typically mounted to the handlebars of the bicycle.

One of the drawbacks of conventional hub-based power meters is that it is difficult and time consuming to remove and install the torque sensing components, thereby limiting a user's ability to transfer the power meter between bicycles. That is, for a user to utilize the power meter with more than one bicycle or wheel, the user must disassemble the entire wheel including the spokes and hub. Since it is common for bicyclists to utilize different types of bicycles for different types of races, events, or training environments, a great deal of time (or expense) may be consumed by having to disassemble the wheel structure of one wheel such that the hub assembly incorporating the torque sensor may be used with another bicycle. Further, it can be cost-prohibitive to outfit each bicycle with a power meter when only one bicycle is being used at a time. In addition, it is difficult for a manufacturer of a hub-based power meter to provide a power meter that can be used with all or a majority of the various rear wheel configurations that are available.

The present invention is generally directed to an apparatus and method for measuring torque and/or power in a driven wheel of a pedal operated device such as a bicycle. In one representative embodiment, the invention includes a cassette that has a plurality of coaxial sprockets coupled to one another and defining a stepped cogset. The cogset may include a body having a plurality of individual sprockets fixed to one another. The body is configured to selectively receive a plurality of additional individual sprockets at an axially outermost portion thereof. A torque sensing element is interconnected between the cogset and the freehub of the rear hub assembly for sensing a torque applied by the user to the rear wheel. The cassette may define a void configured to house the electronics for processing the collected torque data. Alternatively, a rear disc may be provided at an axially innermost position in which the electronics are housed. In either arrangement, the electronics are in communication with the torque sensing element to receive signals therefrom. The electronics are configured for processing the sensed torque data and transmitting the data to a real-time receiver such that it may be displayed to a user.

It is therefore an object of the present invention to provide a torque sensing device that is selectively interchangeable from bike-to-bike and/or wheel-to-wheel. It is yet another object of the present invention to provide a device powered by user operation of a pedal assembly that includes a torque sensing device that is relatively lightweight. It is yet another object of the present invention to provide a cost effective torque sensing system.

Various other features, objects and advantages of the present invention will be made apparent from the following detailed description and the drawings.

BRIEF DESCRIPTION OF THE DRAWINGS

The drawings illustrate the best mode presently contemplated of carrying out the invention.

In the drawings:

FIG. 4 is a partial isometric view, for reference purposes, of the rear cassette of FIG. 3 incorporating a first version of a torque sensing element;

FIG. 5 is a partial isometric view, for reference purposes, of the rear cassette of FIG. 2 incorporating a second version of a torque sensing element;

FIG. 6 is a section view of the rear cassette incorporating the torque sensing element shown in FIG. 5;

DETAILED DESCRIPTION OF PREFERRED EMBODIMENTS

Figure 1:
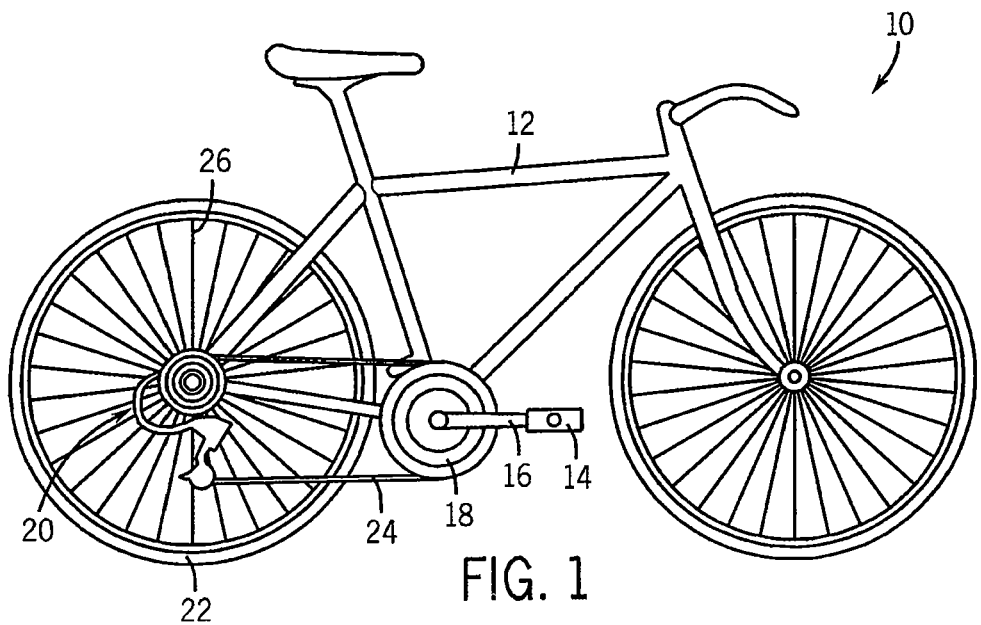
FIG. 1 is a side elevation view of a bicycle incorporating a rear cassette-based power meter in accordance with the present invention.

Turning now to the drawings, and initially to FIG. 1 for reference purposes, a bicycle 10 equipped with a power sensing arrangement is shown. The bicycle 10 includes a frame 12 that rotatably supports a pair of pedals 14 connected by crank arms 16 to a chain ring 18. The chain ring 18 is coupled to the hub 20 of the rear wheel 22 by a chain 24. The bicycle 10 is powered by a cyclist providing rotational forces to the chain ring 18 via the pedals 12 and crank arms 14. The rotation of the chain ring 18 is transferred by the chain 24 to the rear wheel hub 20, which carries the rear wheel 22 into rotation via spokes 26 to drive the bicycle 10 into motion.

Figure 2:
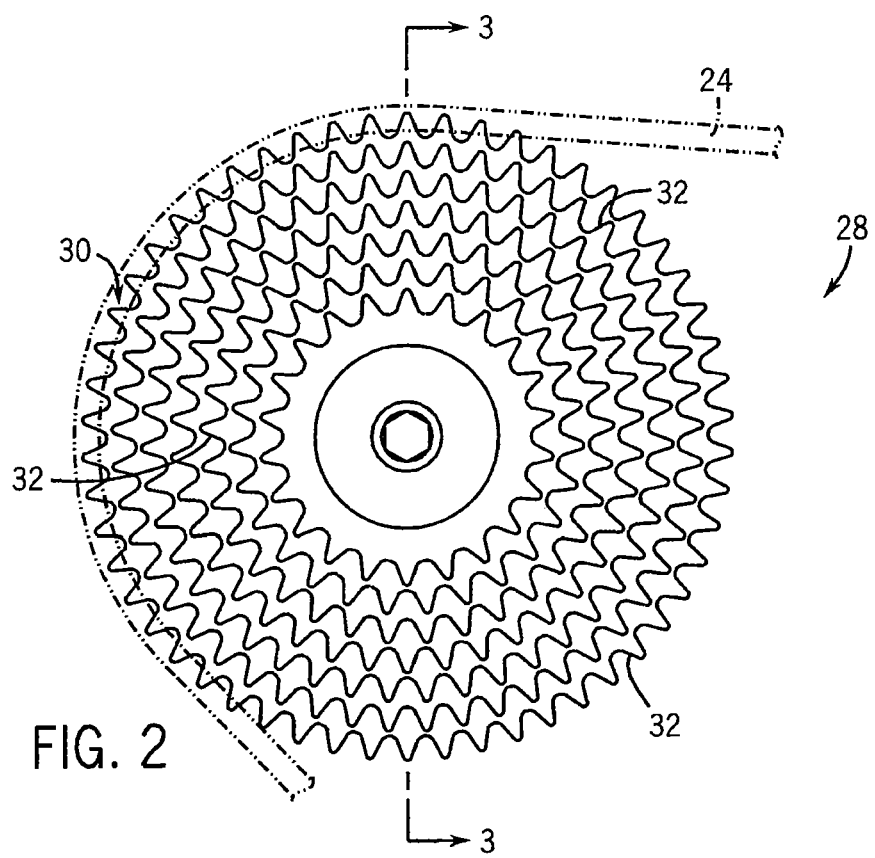
FIG. 2 is a side elevation view of the rear cassette of the bicycle of FIG. 1.

Referring now to FIG. 2, the bicycle further includes a cassette 28 that is engaged with the chain 24 and attached to the rear hub 20 of the bicycle 10 in a known manner and includes a cogset 30 centrally disposed about a rear axle (not numbered) of the bicycle 10. The cogset 30 includes multiple sets of gear teeth 32 extending from a single gear ring 34 but concentrically oriented with respect to one another.

FIGS. 3-9 illustrate, for reference purposes, a torque sensing arrangement incorporated into a cassette 28 having a hollow construction. This arrangement is the subject of copending application Ser. No. 12/204,578 filed Sep. 4, 2008, the disclosure of which is hereby incorporated by reference.

Figure 3:
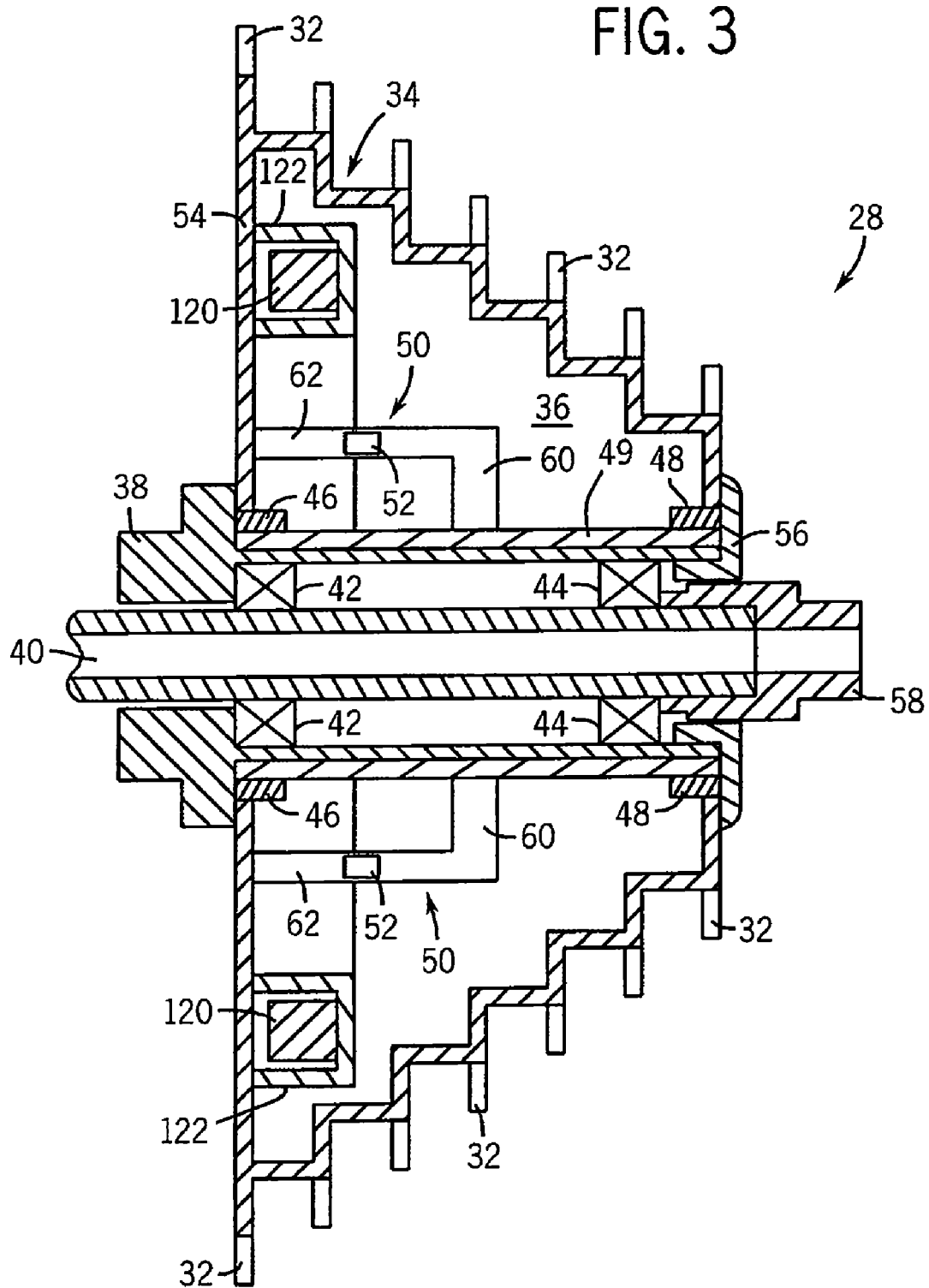
FIG. 3 is a cross section view of the rear cassette of FIG. 2 taken along lines 3-3 showing, for reference purposes, a power meter incorporated into a rear cassette having a hollow construction.

With reference to FIG. 3, the single gear ring 34 has a generally staircase profile with gear teeth 32 extending from each "step" of the ladder-like structure. In this regard, the cassette 28 provides various sets of gears in a manner similar to conventional cassettes but does so without the need for separate gear rings for each set of gear teeth. This construction provides the cassette 28 with a hollow internal cavity or interior 36 that can be used to mount torque sensing components and associated electronics within the cassette 28, as will be described more fully below.

As noted above, the cassette 28 is mounted to the rear hub 20 in a known manner. In this regard, the bicycle 10 includes a freehub 38 through which the rear axle 40 of the bicycle 10 extends. The freehub 38 is coupled to the axle 40 via a pair of bearings 42 and 44 that allow rotation between the freehub 38 and the axle 40. The cassette 28 is isolated from the freehub 38 by isolation bushings 46 and 48 and a sleeve 49. The cassette 28 is thus coupled to the freehub 38 through a series of bending beams 50 and sleeve 49. The cassette 28 includes a back plate 54 having an opening (not numbered) defined therein for sliding the cassette 28 over the sleeve 49 which is splined to the freehub 38. The bending beams 50 are interconnected between the sleeve 49 and the back plate 50. In one representative embodiment, the bending beams 50 are connected via splined sleeve 49 to the freehub 38, although it is understood that other types of torque transferring connections may be used. As will be explained in greater detail below, each bending beam 50 includes one or more torque sensing elements 52, e.g., strain gauges, to sense the torque placed on the free hub 38 as the cyclist pedals the bicycle 10.

A lock ring 56 or similar retainer may be used to secure the cassette 28 to the freehub 38 to limit linear movement of the cassette 28 along the body of the freehub 38. The axle 40 is secured in place by way of a nut 58. As known in the art, a spindle (not shown) may be inserted through the axle 40 and a locking cap (not shown) may be used to secure the aforementioned components to the rear fork of the bicycle 10.

With additional reference to FIG. 4, each bending beam 50 includes a radially extending leg 60 that is coupled to the sleeve 49 and an axially extending header 62 extending laterally from the leg and connected to the back plate 54. In a preferred embodiment, a torque sensing element 52 is carried on opposing sides of each header 62. The torque sensing elements 52 are preferably bonded to the bending beams 50 using an adhesive or similar known fastening mechanism.

Accordingly, in operation, rotational forces applied to the cassette 28 are transmitted to the rear plate 54 and transmitted directly to the bending beams 50. The bending beams 50 deform in response to the applied torque, and the torque sensing elements 52 detect the deformation experienced by the bending beams 50. Corresponding signals associated with the bending strain in the beams 50 are derived from the torque sensing elements 52, and are then processed by electronics operably coupled to the torque sensing elements 52. Further, the processed data may then be transmitted by way of a transmitter such as an RF transmitter to a receiver as is generally understood in the art for subsequent processing and calculation of various parameters, such as power.

Turning now to FIGS. 5 and 6, in accordance with another embodiment of the invention, the torque sensing elements 52 are mounted to a tube 64 that fits over the freehub 38. In this embodiment, the end of the inner surface of the tube 64 is splined to engage the splines of the freehub 38. The freehub 38 is isolated from the rear plate 54 of the cassette 28 in a manner similar to that described above, but is coupled to the cassette 28 through the tube 64 which is coupled directly to the rear plate 54. Thus, with reference to FIG. 6, the "left side" of tube 64 is solidly connected to the rear plate 54 of the hollow cassette 28 and the "right side" of the hollow cassette 28 is isolated from the tube 64 by an isolation bushing 65. The "left side" of the tube 64 is isolated from the freehub 38 by bushing 67. In one embodiment, the tube 64 may be coupled to the rear plate 54 by welding or by a series of rivets or studs (not shown), but is understood that other connections may be used. In operation, the torque applied to the cassette 28 is transmitted from the back plate 54 to the freehub 38 through the tube 64. The torque is sensed by the torque sensing elements 52, which sense torsional strain experienced by tube 64 in the transfer of power from back plate 54 to the freehub 38. The sensed strain signals are then processed by electronics mounted in the cassette 28 and transmitted to a receiver for further processing.

Figure 7:
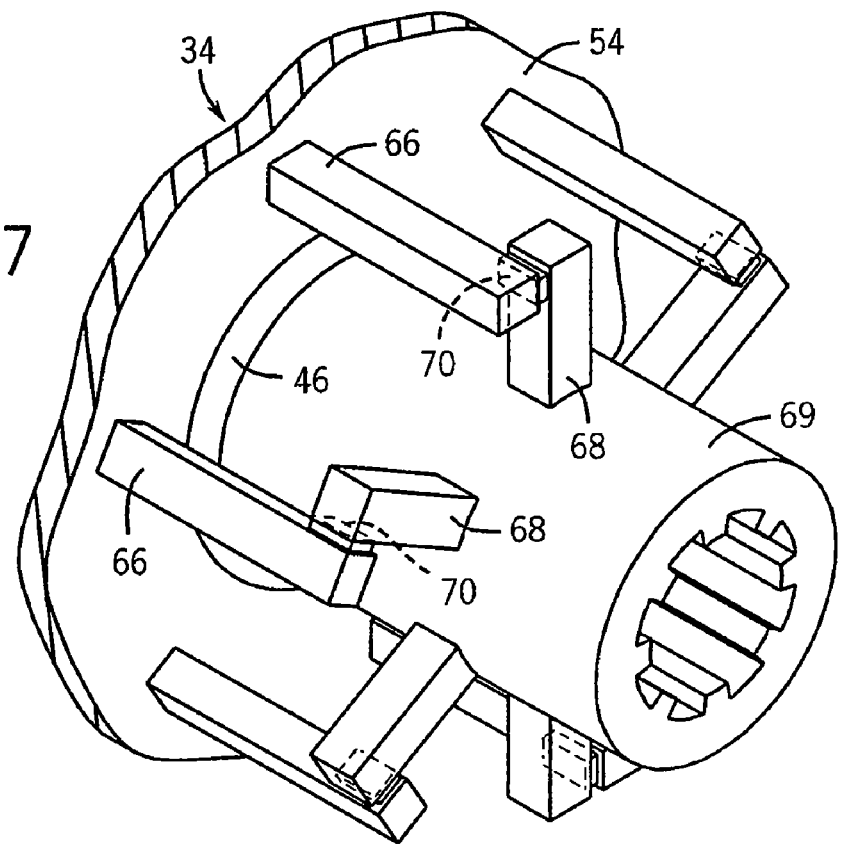
FIG. 7 is a partial isometric view, for reference purposes, of the rear cassette of FIG. 2 incorporating a third version of a torque sensing element.

FIG. 7 illustrates yet another manner in which the torque applied by a cyclist can be measured to assess the amount of power the cyclist is exerting to propel the bicycle. In this embodiment, a series of interconnected torque transmission beam elements 66 and 68 are connected to the rear plate 54 and the freehub 38. More particularly, each axial beam element 66 is coupled to the rear plate 54 and extends from the rear plate 54 along an axis generally parallel to the longitudinal axis of the freehub 38. Each radial beam element 68 is secured to the a sleeve 69 which is connected to the freehub 32 and is oriented orthogonal to one of the axial beam elements 66. A torque sensing element 70 is positioned between each axial beam element 66 and its corresponding radial beam element 68.

In this embodiment, torque sensing element 70 includes a compressive force sensor adapted for detecting a compressive force between the beam elements 66, 68. Accordingly, in operation, as the torque is transmitted through the cassette rear plate 54 to the freehub 38 through the beam elements 66, 68, the torque sensing elements 70 measure a compressive force experienced between the beam elements 66, 68. The measured compressive force may then be processed by electronics housed within the cassette 28 and transmitted to a receiver as described previously.

Figure 8:
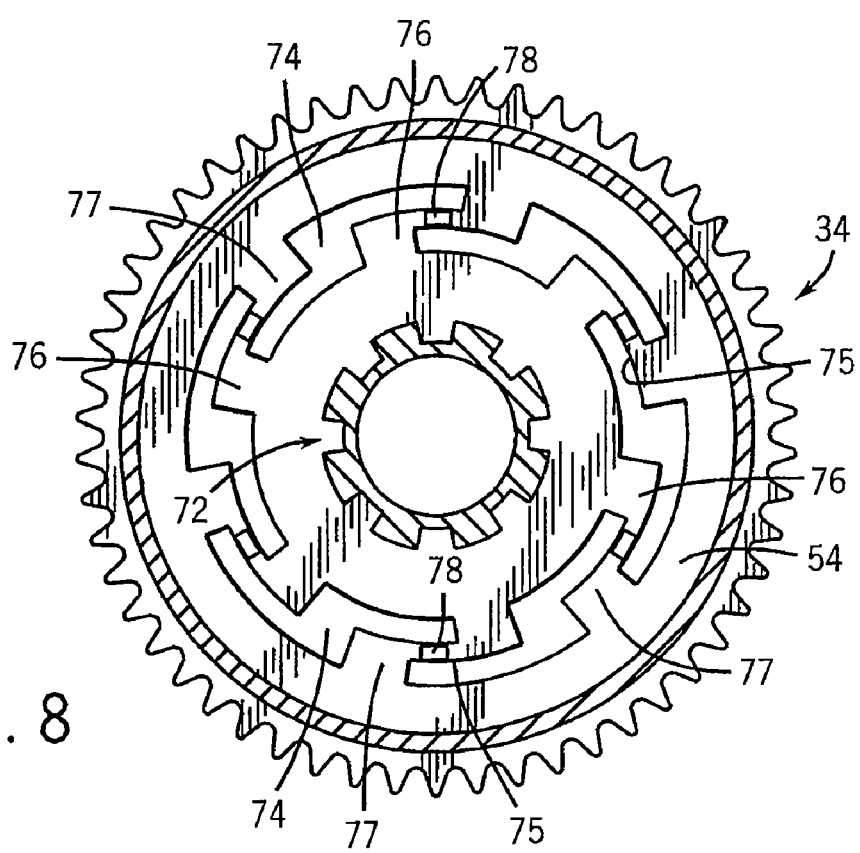
FIG. 8 is a side elevation view, for reference purposes, of a hollow cassette back plate incorporating another torque sensing arrangement.

Referring now to FIG. 8, in accordance with another embodiment, the rear plate 54 of the cassette 28 includes splines 72 adapted to receive corresponding members of the freehub 38. In the illustrated embodiment, the rear plate 54 includes a series of somewhat Z-shaped openings 74 within the area of the rear plate 54. The openings 74 are constructed such that consecutive adjacent openings 74 have portions that overlap but are separated from one another by a narrowed neck section 75. The inner portions of the rear plate 54 defined by openings 74, generally designated by reference numeral 76, and the outer portions of the rear plate 64 defined by openings 74, generally designated by reference numeral 77, are interconnected by the neck sections 75 which function to transmit torque from the outer area of the rear plate 54 to the inner area of the rear plate 64. A torque sensing element 78 is bonded to each of the neck sections 75. The torque sensing elements 78 are preferably strain gauges, which function to sense strain in the neck sections 75 resulting from bending forces applied to the neck sections 75. In operation, the torque experienced by the torque transmission structural elements 76 is sensed by torque sensing elements 78, processed by electronics housed in the cassette and transmitted to a receiver as rear plate used previously.

Figure 9A:
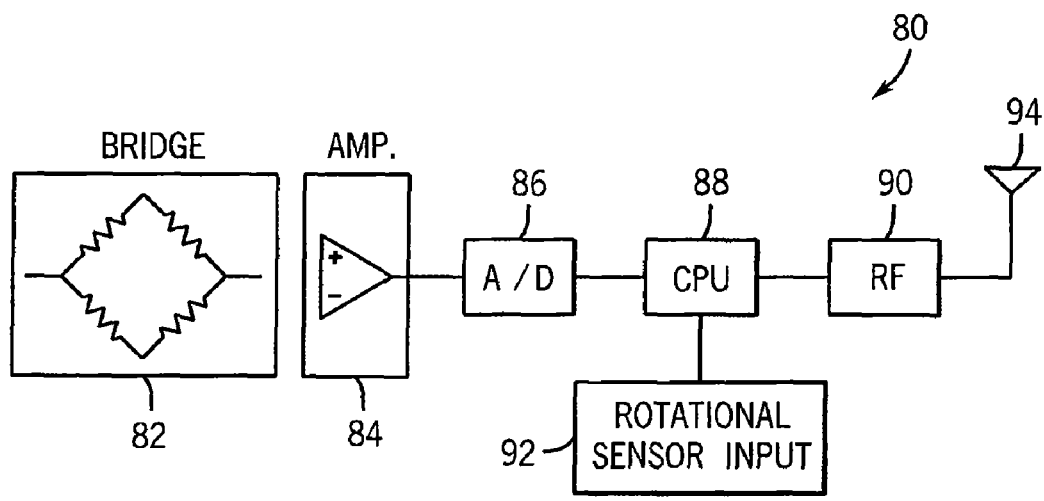
FIG. 9A is a schematic representation of an electronics arrangement for a power meter of the present invention.

Referring now to FIG. 9A, an electronics assembly 80 for measuring the torque applied by the cyclist is shown. Referring initially to FIG. 9A, the electronics assembly 80 includes a Wheatstone bridge 82 in communication with an amplifier 84 for amplifying the signal measured by the bridge 84. One skilled in the art will appreciate that a strain gauge such as those shown and described above can be schematically represented by a Wheatstone bridge. An A/D converter 86 is included for conversion of the analog signal detected by the bridge 82 to a digital signal. A CPU 88 is provided and receives data from a rotational sensor 90 that detects rotation of the rear or front wheel of the bicycle as known in the art. The CPU 88 receives the torque measurement as detected by Wheatstone bridge 82 together with angular velocity information from the sensor 90 to determine the amount of power applied by the cyclist. The calculated values may then be transmitted by way of a RF transmitter 92 to an antenna 94 or receiver so that the corresponding performance values and those derived therefrom may be recorded and/or displayed to the user as known in the art. It is understood that the CPU may calculate or otherwise derive additional performance values from the torque and/or angular measurements referenced above. For example, the CPU may calculate bicycle speed, cadence, distance traveled, and time of ride as well as average values, such as average power, average speed, and the like.

Figure 9B:
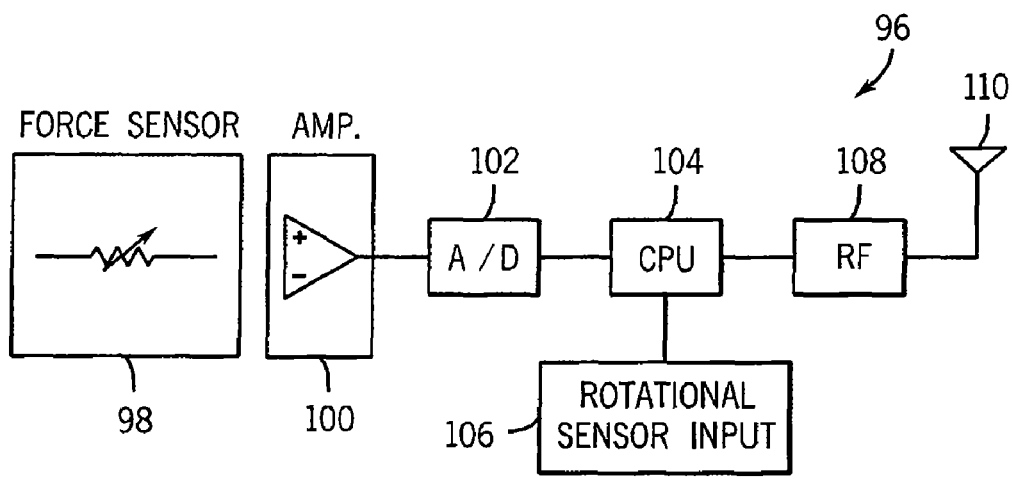
FIG. 9B is a schematic representation of an alternative electronics arrangement of the power meter of the present invention.

FIG. 9B illustrates another embodiment of an electronics assembly 96. Electronics assembly 96 is substantially similar to electronic assembly 80 described above; however, in this embodiment, a force sensor 98 is used for measuring the force applied by the user rather than a Wheatstone bridge. Components 100 through 110 are similar to components 84 through 94 described above.

Referring again to FIG. 1, the electronic components indicated in FIGS. 9A and 9B may be configured to fit within the internal cavity 36 of the cassette 28. Representatively, the electronic components may be carried by a suitable component carrier 120 that is contained within a housing 122 configured to be received and mounted within the internal cavity 36. The component carrier 120 and housing 122 may be in the shape of a ring that is interconnected with the rear plate 54, although it is understood that such components may have any desired configuration and may be secured in any satisfactory location within the internal cavity 36 of the cassette 28.

Additionally, it should be understood that the CPU may be positioned in the hollow portion of the cassette, but it is understood that the CPU could be mounted elsewhere on the bicycle, e.g., handlebars, and the output of the torque sensing elements and the velocity sensor could be transmitted via a wired or wireless communication to the CPU.

FIGS. 10-16 illustrate a torque sensing arrangement associated with the rear hub 20 of the bicycle 10 in accordance with the present invention.

Figure 10:
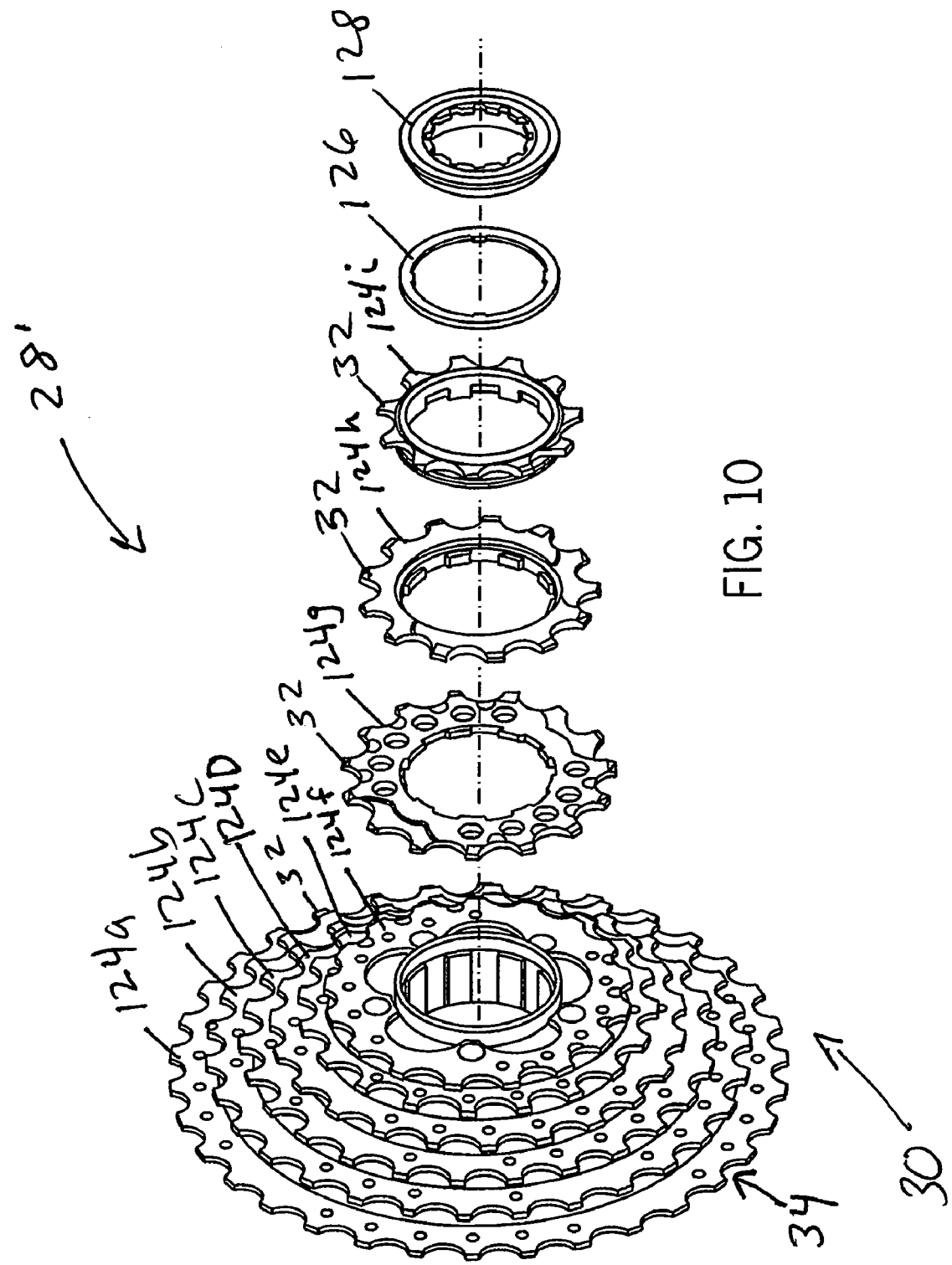
FIG. 10 is an exploded view of a rear cassette assembly as in FIG. 2, showing a power sensing arrangement located between the rear cassette and the freehub in accordance with the present invention.

Referring to FIG. 10, rear cassette 28' has an alternate construction from that shown in FIGS. 1-8, and is adapted for use with the torque measurement apparatus of the present invention. Cassette 28 is in the form of a cogset 30 having a stepped arrangement in which the axially innermost sprocket has the largest diameter and number of gear teeth 32 and the axially outermost sprocket has the smallest diameter and number of gear teeth 32. Cogset 30 is in the form of a single gear ring 34 having a plurality of individual sprockets 124a-124f fixed to one another by conventional means. Cogset 30 includes a plurality of individual sprockets 124g-124i that are secured to an axially outermost portion of single gear ring 34. Individual sprockets 124g-124i are secured to single gear ring 34 by means of a lock ring 126 and a retainer ring 128.

Figure 11:
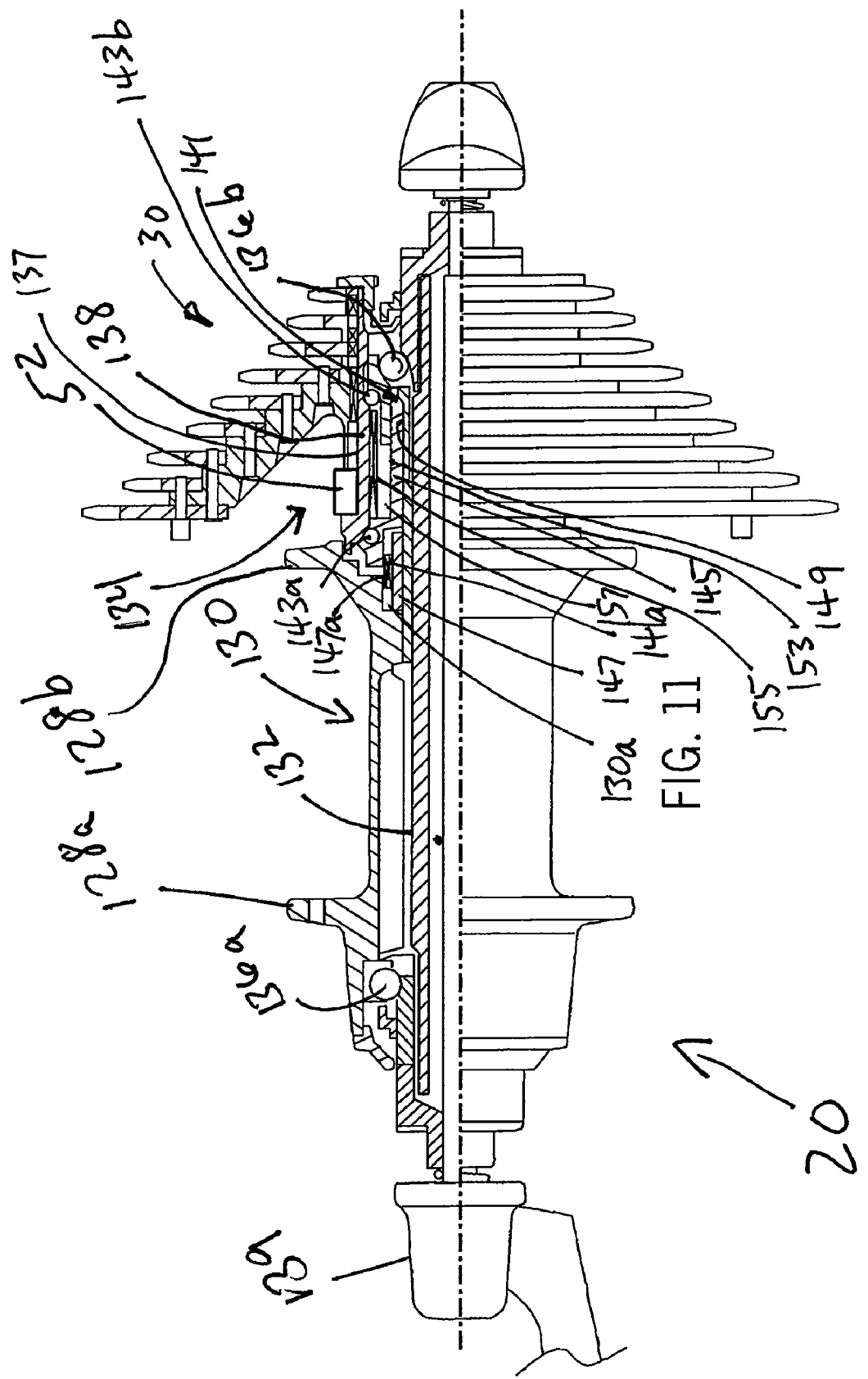
FIG. 11 is cross-section view of the rear hub assembly incorporating the rear cassette of FIG. 10 and a torque sensing element located between the rear cassette and the freehub in accordance with the present invention.
Figure 12:
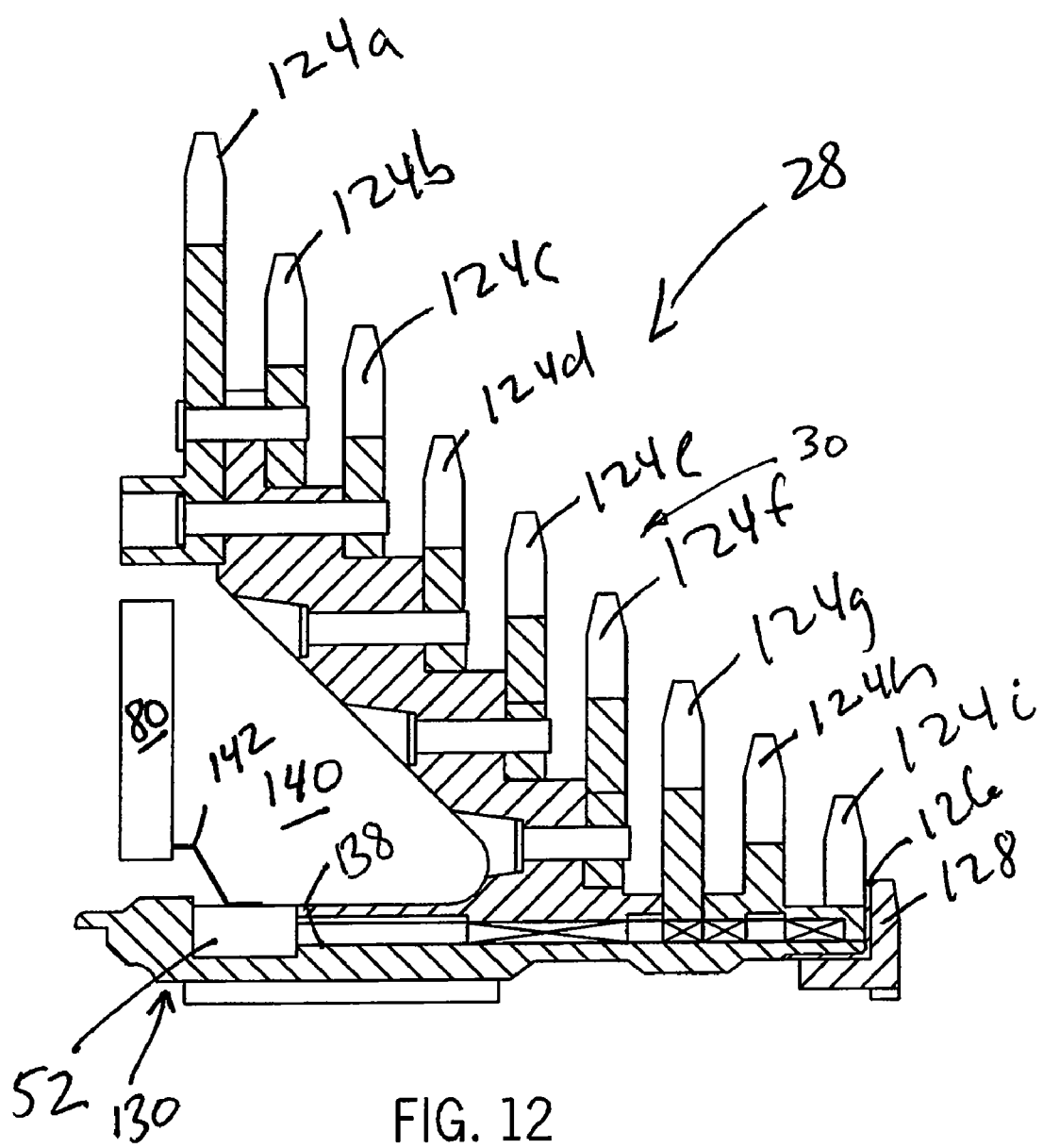
FIG. 12 is a partial cross-section view of the rear hub assembly of FIG. 11 showing a torque sensing means provided outside of the freebody of the rear hub assembly and incorporating an electronics assembly into a cavity of the rear cassette assembly.

FIGS. 11-12 illustrate rear cassette 28' of FIG. 10 and a torque measurement system in accordance with the present invention. The rear hub 20 includes a hub body 130 disposed around a hub shaft 132. A freehub assembly 134 is provided at the drive side of hub body 130. First and second bearings 136a, 136b, respectively, are arranged between hub shaft 132 and freehub assembly 134 and between the hub shaft 132 and the freehub assembly 134, so that hub body 130 and freehub assembly 134 are rotatably supported on hub shaft 132, in a manner as is known. Cogset 30 is nonrotatably fixed relative to a sprocket mounting surface 137 of an outside member 138 of freehub assembly 134 such that sprockets 124a-124i rotate integrally with outside member 138. Outside member 138 includes a plurality of splines on mounting surface 137 for nonrotatably coupling to cassette 28' as is generally understood.

Hub shaft 132 includes a clamp-type retainer, which may be in the form of a quick-release mechanism 139, so that the hub shaft 132 can be attached to and detached from rear dropouts (not shown) easily without use of a tool. Hub body 130 is a substantially cylindrical member formed with hub flanges 128a and 128b. Hub body 130 may be formed of any satisfactory material, such as an aluminum alloy, and spokes are attached at various locations along the outer peripheral surfaces of hub flanges 128a and 128b.

Free hub assembly 134 includes an inside member 141, outside member 138 disposed around inside member 141, third and fourth bearings 143a and 143b disposed between inside member 141 and outside member 138 so that outside member 138 is rotatably supported around inside member 141, and a pawl-type one-way clutch 145 disposed between inside member 141 and outside member 138 for transmitting rotation of inside member 141 to outside member 138 in only one direction to propel the bicycle 10.

Inside member 141 includes a stepped cylindrical member, and is connected to hub body 130 by a cylindrical connecting member 147 so that inside member 141 rotates integrally with hub body 130. More specifically, connecting member 147 includes splines 147a formed on the outer peripheral surface thereof for engaging splines 141a formed on the inner peripheral surface of inside member 141 and for engaging splines 130a formed on the inner peripheral surface of hub body 130. Inside member 141 is axially fixed to hub body 130 by a cylindrical bolt 149 that extends through the inner peripheral surface of inside member 141 and through the opening defined by connecting member 147, and screws into a threaded inner peripheral surface of hub body 130.

Outside member 138 is rotatably supported on the outer peripheral surface of inside member 141 by third and fourth bearings 143a and 143b. As noted above, the mounting surface 137 of outside member 138 forms a series of splines with different circumferential widths for mounting rear sprocket assembly 28'.

A one-way clutch 153 comprises a plurality of ratchet teeth 155 formed on the inner peripheral surface of outside member 138, a series of clutch pawls 157 circumferentially disposed around the outer peripheral surface of inside member 141, and a biasing member (not shown) for biasing clutch pawls 157 toward ratchet teeth 155 in a known manner.

Because sprockets 124g-124i are not integral with single gear ring 34 as in the construction of the rear cassette as illustrated in FIGS. 3-8, the present invention functions to measure torque through a portion of the hub assembly through which the cassette 28' transfers torque, as opposed to the cassette itself as in the previous version. As such, a torque sensing element 52 such as, for example, a series of strain gauges, are provided on outside member 138 of freehub assembly 134. The torque sensing assembly according to the present embodiment may include a number of torque sensing elements 52 disposed around the outer surface of outside member 138 for detecting torque that is transferred from the outside member 138 to the hub body 130 of freehub assembly 134. The torque sensing elements 52 detect torsional strain applied to outside member 138, and are arranged at least 90 degrees from one another. Preferably, portions of the splines of outside member 138 are recessed so as to define an underlying reduced diameter torque transfer and strain sensing area, and to receive torque sensing elements 52. The recessed areas of the splines are adapted for securely receiving torque sensing elements 52 therein. Torque sensing elements 52 are preferably secured to the recessed areas by way of an adhesive or other such method.

Referring to FIG. 12, cassette 28' defines a cavity 140 proximate torque sensing element 52. In one form, electronics assembly 80 is housed within cavity 140. As in the previous versions, electronics assembly 80 is connected to torque sensing elements 52 to receive strain signals from the torque sensing elements 52 that correspond to the applied torque and therefore the power applied by the user to propel bicycle 10. As shown in FIG. 12, electronics assembly 80 is operably coupled to torque sensing element 52 by way of wires, cables, or similar such coupling member 142. Alternative communication means including wireless transmission from torque sensing element 52 and electronics assembly 80 are within the scope of the present invention. Electronics assembly 80 processes the received strain signals to calculate torque data, which in turn is used to calculate the power applied by the user from the sensed torque data and angular velocity measurements. Electronics assembly 80 according to the present embodiment is may be packaged for fitting into cavity 140. As such, electronics assembly 80 may comprise relatively small circuits as is generally understood in the art.

Figure 13:
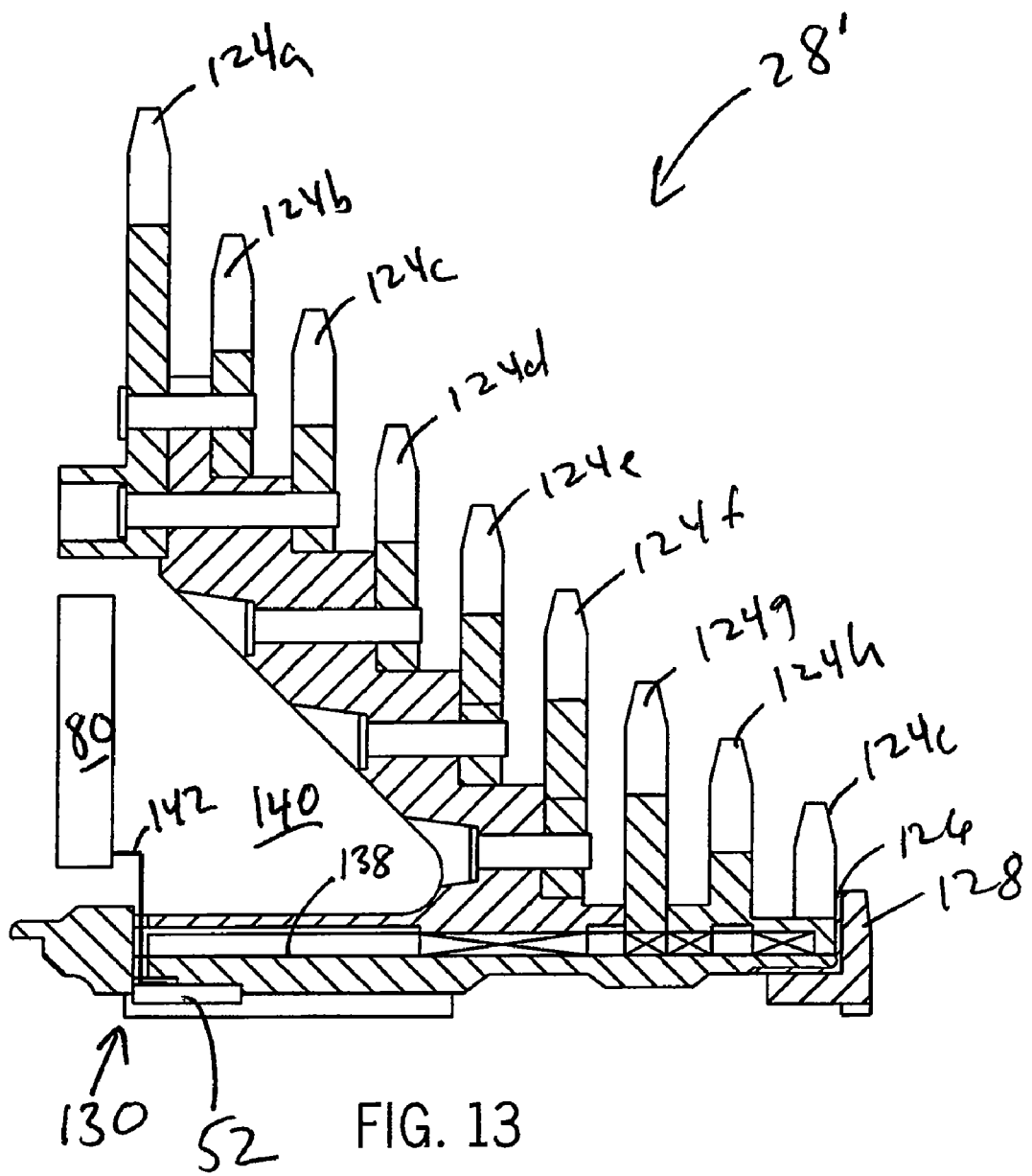
FIG. 13 is a cross-section view of an alternative embodiment of the torque sensing means incorporated into the rear hub assembly of a bicycle in accordance with the present invention.

Referring now to FIG. 13, an alternative embodiment of the present invention utilizing the construction of cassette 28' of FIG. 10 is illustrated. In this embodiment, torque sensing elements 52 are provided within the interior of the freehub assembly 134. Specifically, the torque sensing elements 52 are disposed around the inner surface of outside member 138 for detecting torque that is transferred from the outside member 138 to the hub body 130 of freehub assembly 134. To accommodate placement of torque sensing elements 52 within the freehub assembly 134, the interior of the outside member 138 may be recessed, and each torque sensing element 52 is received within the recess. The recessed areas provide an overlying reduced diameter torque transfer and strain sensing area for the torque sensing elements 52. As in the previous embodiment, electronics assembly 80 may be provided within cavity 140 and interconnected with torque sensing elements 52 by way of connectors such as wires 142, each of which extends through an opening in outside member 138.

Figure 14:
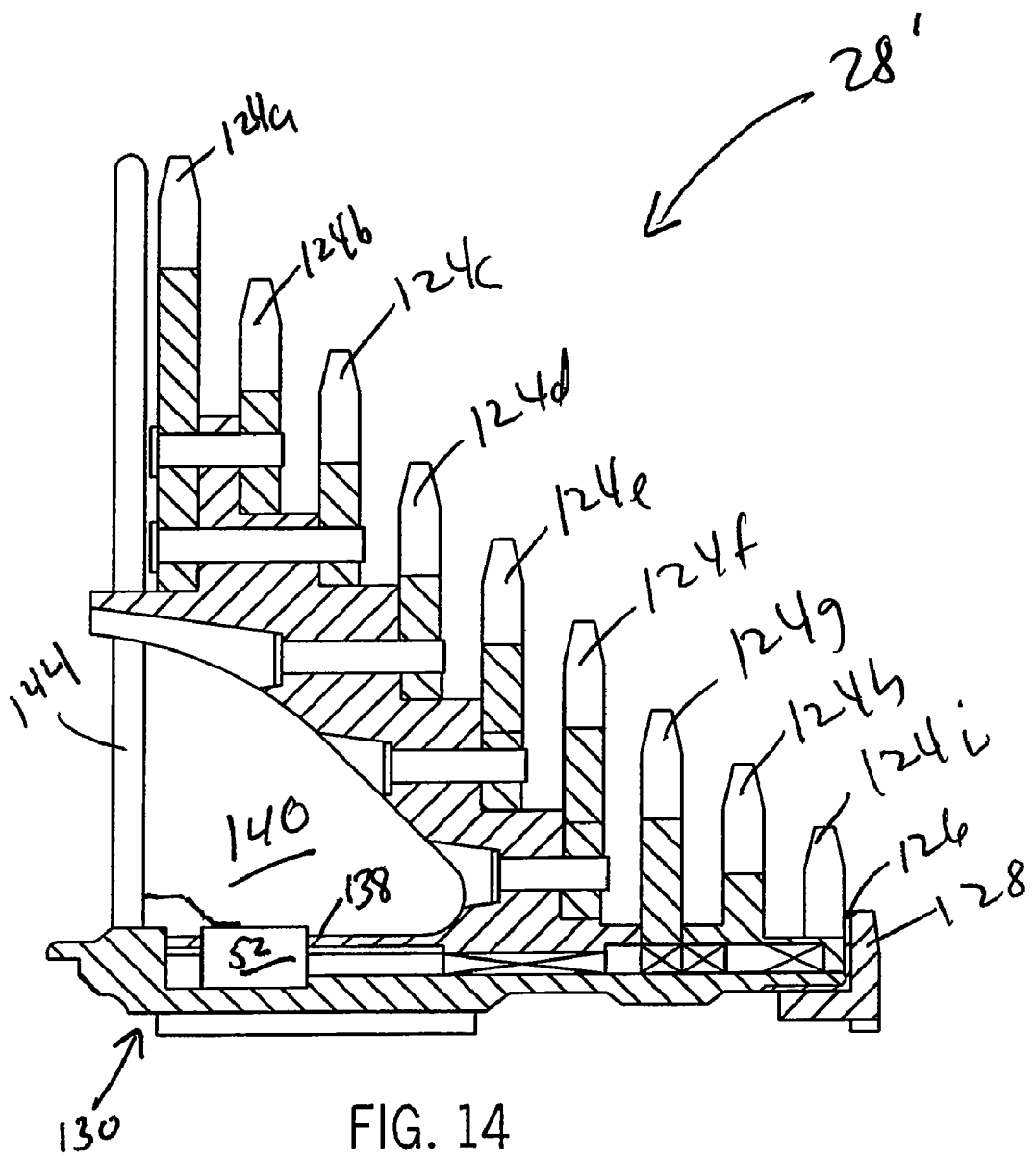
FIG. 14 is a cross-section view of an alternative embodiment of the torque sensing means incorporated into the rear hub assembly of a bicycle in accordance with the present invention, wherein the electronics assembly is incorporated into a disk of the hub assembly.

Turning now to FIG. 14, an alternative embodiment of the present invention is shown. The present embodiment is substantially similar to that of FIGS. 11-12 in which torque sensing elements 52 are disposed around the outer surface of outside member 138 for detecting torque that is transferred from the outside member 138 to the hub body 130 of freehub assembly 134. However, instead of positioning electronics assembly 80 within cavity 140, electronics assembly 80 is housed in or on a rear disc 144. Rear disc 144 is interconnected with cassette 28' and extends outwardly from freehub assembly 138 parallel to sprockets 124a-124i. Rear disc 144 may package the necessary electronic components in a manner generally understood in the art. As in the previous embodiments, interconnection between torque sensing elements 52 and electronics assembly 80 housed in or on rear disc 144 may be accomplished through a standard wired connection or through alternative means such as wirelessly. Alternatively, torque sensing elements 52 may be housed within outside member 138 of freehub assembly 138 like in FIG. 13 and interconnected with rear disc 144. Providing the electronics assembly 80 in rear disc 144 offers a number of advantages. For instance, since rear disc 144 will be visible to an outside observer, it provides an externally visible means of indicating the use of the power meter of the present invention. More functionally, the rear disc 144 construction of the present embodiment provides the electronics assembly 80 with improved antenna performance and product robustness potential. Rear disc 144 may also be constructed to provide a seal that prevents dirt, moisture and other contaminants from entering recess 140.

Figure 15:
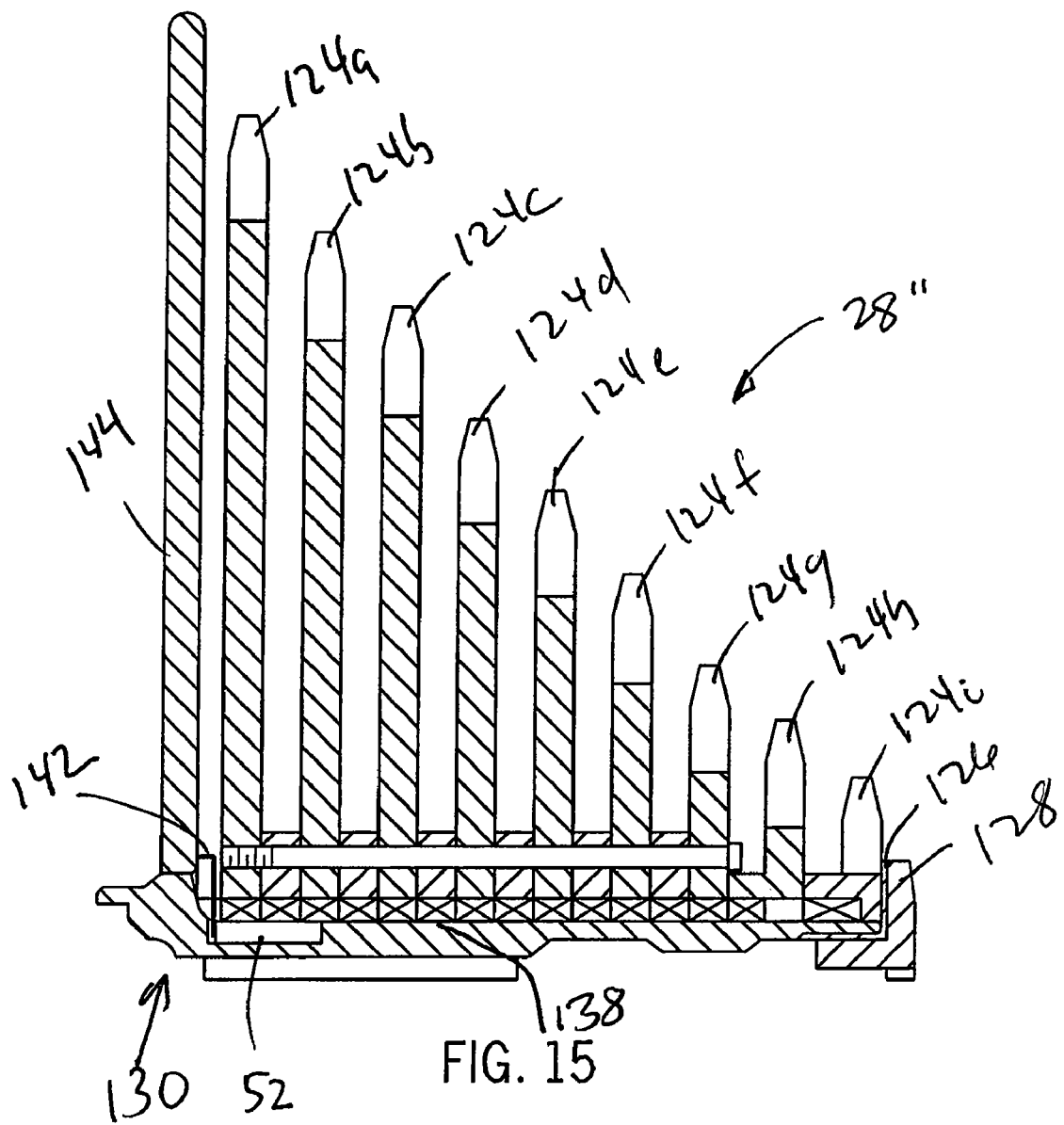
FIG. 15 is a cross-section view of an alternative embodiment of the torque sensing means incorporated into the rear hub assembly of a bicycle in accordance with the present invention.

FIG. 15 illustrates yet another embodiment according to the present invention in which torque sensing elements 52 are mounted to outside member 138 of the freehub assembly 134. Similar to the embodiment illustrated in FIG. 14, the present embodiment includes a rear disc 144 that is coupled to the rear wall of the cassette, which in this embodiment is shown at 28". As in the previous embodiment, rear disc 144 houses and/or packages the necessary electronics assembly 80. In the present embodiment, however, the cavity 140 is not present. Instead, in the present embodiment all of the sprockets 124a-124i are nonrotatably mounted directly to outside member 138 rather than as in the previous embodiments wherein at least some of the sprockets were indirectly mounted to the outside member 138. Again, however, the torque sensing elements 52 function to sense the torsional strain experienced by outside member 138 in transferring torque to freehub assembly 134.

Figure 16:
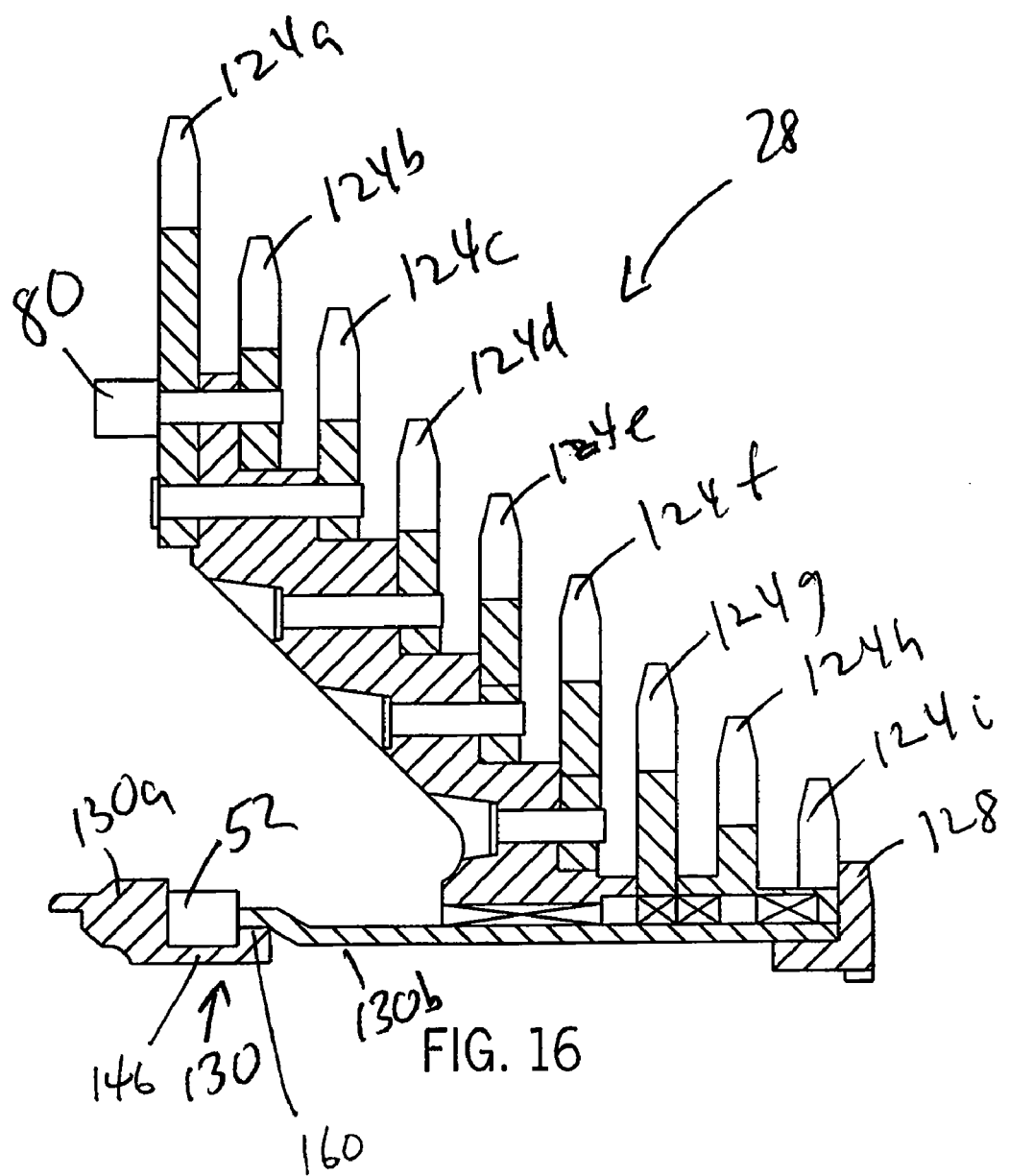
FIG. 16 is a cross-section view of another embodiment of the torque sensing means incorporated into the rear hub assembly of a bicycle in accordance with the present invention, wherein force measurement occurs outside of a freebody of the hub assembly.

FIG. 16 illustrates another embodiment of the present invention. In this embodiment, freehub assembly 134 includes a two-piece hub body 130. The two-piece hub body 130 defines a first, inner portion 130a and a second, outer portion 130b coupled to one another, such as by means of a splined or threaded connection at an interface 160 between inner portion 130a and outer portion 130b. Torque sensing elements 52 are mounted to first portion 130a of the hub body 130, within a recess or other structure that defines an underlying torque transfer area 146. As in the previous embodiments, the torque sensing elements 52 function to sense the torsional strain experienced by torque transfer area 146 when torque is transferred from second portion 130b to first portion 130a. In this embodiment, however, the two-piece construction of hub body 130 provides significant advantages. In particular, freebodies wear with use and occasionally require replacement. With a two piece freebody as shown and described, the wear portion of the freebody 128, i.e. second portion 130b, may be removed and replaced without having to replace the power sensing portion of the freebody 128, i.e. first portion 130a. Accordingly, the user is able to replace the wear portion of the freebody without incurring the expense associated with replacement of the power sensing components of the freebody.

With respect to the embodiments illustrated in FIGS. 11-16, electronics assembly 80 could alternatively be integrated into or otherwise provided with torque sensing elements 52. In other words, electronics assembly 80 could be integrally formed into the recessed areas of the splines of outside member 138 rather than being located within the cavity 140 or without necessitating a rear disc 144 for packaging the electronic components.

The present invention has been described in terms of the preferred embodiment, and it is recognized that equivalents, alternatives, and modifications, aside from those expressly stated, are possible and within the scope of the appending claims.

What is claimed is:

1. A freehub assembly for a bicycle, comprising:
an outer freehub member configured to mount a drive gear arrangement, wherein the outer freehub member defines an interior, and wherein the drive gear arrangement is adapted to be driven by power applied by a user to pedals of the bicycle;
an inner freehub member contained within the interior of the outer freehub member;
a one-way drive mechanism interposed between the outer freehub member and the inner freehub member; and
a torque sensing arrangement on the outer freehub member, wherein the torque sensing arrangement is configured and arranged to sense torque transmitted from the outer freehub member to the inner freehub member of the freehub assembly through the one-way drive mechanism.

2. The freehub assembly of claim 1, further comprising an electronics assembly interconnected with the torque sensing arrangement, wherein the electronics assembly receives signals from the torque sensing arrangement corresponding to torque experienced by the outer freehub member upon application of power by a user to the drive gear arrangement, processing the signals to create torque data, and transmitting the processed torque data to a receiver.

3. The freehub assembly of claim 2, wherein the drive gear arrangement defines a cavity positioned adjacent the outer freehub member, and wherein the electronics assembly is housed within the cavity.

4. The freehub assembly of claim 3, wherein the electronics assembly is packaged into a rear disc mounted to an axially inner most portion of the freehub assembly.

5. The freehub assembly of claim 1, wherein the torque sensing arrangement comprises at least one torque sensing element mounted to the outer freehub member.

6. The freehub assembly of claim 5, wherein the torque sensing element comprises at least one strain gauge secured to the outer freehub member.

7. The freehub assembly of claim 6, wherein the at least one strain gauge comprises a plurality of strain gauges circumferentially spaced from one another around an outside of the outer freehub member.

8. The freehub assembly of claim 6, wherein the at least one strain gauge is housed within the interior of the outer freehub member.

9. The freehub assembly of claim 8, wherein the at least one strain gauge comprises a plurality of strain gauges circumferentially disposed around an inner wall of the outer freehub member that defines the interior of the outer freehub member.

10. The assembly of claim 9, wherein the plurality of strain gauges are spaced at 90 degrees from one another about a circumference of the outer freehub member.

11. The freehub assembly of claim 5, wherein the outer freehub member includes a plurality of splines configured to couple the outer freehub member to the drive gear arrangement, and wherein the outer freehub member includes at least one recessed area for receiving the at least one strain gauge.

12. The freehub assembly of claim 1, wherein the outer freehub member comprises a two-piece construction having an inside member and an outside member, and wherein the torque sensing element is secured to the outside member of the outer freehub member.

13. A power sensing drive assembly for use with a user-powered apparatus having a power input arrangement, comprising:
a freehub assembly adapted to be driven by the power input arrangement, wherein the freehub assembly includes an outer freehub member configured to mount a component of the power input arrangement, wherein the outer freehub member defines an interior; an inner freehub member contained within the interior of the outer freehub member; and a one-way drive mechanism interposed between the outer freehub member and the inner freehub member;

a torque sensing arrangement on the outer freehub member, wherein the torque sensing arrangement is configured and arranged to sense torque applied by a user to the power input arrangement; and an electronics assembly interconnected with the torque sensing arrangement, wherein the electronics assembly receives signals from the torque sensing assembly corresponding to torque experienced by the outer freehub member upon application of power by a user to the power input arrangement.

14. The power sensing drive assembly of claim 13, wherein the power input arrangement defines an internal cavity, and wherein the electronics assembly is contained within the cavity.

15. The power drive-sensing drive assembly of claim 13, wherein the outer freehub member includes an inner surface and an outer surface, wherein the inner surface defines the interior of the outer freehub member.

16. The power sensing drive assembly of claim 15, wherein the the torque sensing arrangement is secured to the outer surface of the outer freehub member.

17. The power sensing drive assembly of claim 15, wherein the torque sensing arrangement is secured to the inner surface of the outer freehub member.

18. The power sensing drive assembly of claim 13, wherein the electronics assembly comprises a rear disc mounted at an axially innermost portion of the power input arrangement.

19. The power sensing drive assembly of claim 13, wherein the torque sensing arrangement comprises at least one torque sensing element.

20. The power sensing drive assembly of claim 19, wherein the at least one torque sensing element comprises a strain gauge.

21. The power sensing assembly of claim 19, wherein the at least one torque sensing element comprises a plurality of strain gauges circumferentially mounted about a portion of the outer freehub member.

* * * * *